United States Patent [19]
Justman et al.

[11] Patent Number: 5,037,212
[45] Date of Patent: Aug. 6, 1991

[54] BEARING STRUCTURE FOR DOWNHOLE MOTORS

[75] Inventors: Dan B. Justman, Houston; George A. Cross, Kingwood, both of Tex.

[73] Assignee: Smith International, Inc., Houston, Tex.

[21] Appl. No.: 619,775

[22] Filed: Nov. 29, 1990

[51] Int. Cl.⁵ .............................................. E21B 4/02
[52] U.S. Cl. ...................................... 384/97; 384/95; 384/907.1; 175/107
[58] Field of Search ................... 384/95, 97, 282, 303, 384/304, 317, 907.1; 175/107, 329

[56] References Cited

U.S. PATENT DOCUMENTS

| | | | |
|---|---|---|---|
| T102,901 | 4/1983 | Offenbacher | 384/95 X |
| 4,410,054 | 10/1983 | Nagel et al. | 384/95 X |
| 4,468,138 | 8/1984 | Nagel | 384/303 |
| 4,620,601 | 11/1986 | Nagel | 175/107 |
| 4,708,496 | 11/1987 | McPherson | 384/303 |
| 4,720,199 | 1/1988 | Geczy et al. | 384/282 |
| 4,729,440 | 3/1988 | Hall | 384/95 X |
| 4,732,491 | 3/1988 | Geczy | 384/95 |
| 4,756,631 | 7/1988 | Jones | 384/95 |
| 4,789,251 | 12/1988 | McPherson et al. | 384/317 |
| 4,802,539 | 2/1989 | Hall et al. | 384/95 X |

Primary Examiner—Thomas R. Hannon
Attorney, Agent, or Firm—Robert M. Vargo

[57] ABSTRACT

A bearing assembly for a downhole motor comprising a pair of annular support rings, each having a plurality of polycrystalline diamond thrust bearing inserts mounted thereon. The rings are oriented to have the respective inserts face and bear against each other. In operation, drilling mud passes through the space between the inserts to cool the inserts. The rings are made of tungsten carbide to prevent erosion of the areas at the bases of the inserts, thereby improving the life of the thrust bearings.

8 Claims, 3 Drawing Sheets 5,037,212

BEARING STRUCTURE FOR DOWNHOLE MOTORS

BACKGROUND OF THE INVENTION

I. Field of the Invention

The present invention relates generally to polycrystalline diamond bearings for supporting the drive shaft of a downhole well drilling motor and more particularly to the support structure for such bearings.

II. Description of the Prior Art

Polycrystalline diamond (PCD) bearings have found application in oil drilling and other environments demanding high load carrying ability under extreme wear conditions.

The use of PCD inserts in thrust bearings is specifically described in U.S. Pat. Nos. 4,468,138; 4,620,601; 4,708,496; 4,720,199; 4,732,491; and 4,789,251.

In the prior art, these thrust bearings usually consisted of a pair of annular steel plates each supporting a plurality of cylindrical tungsten carbide studs having disc-shaped diamond bearings mounted thereon. Such bearing arrangements were unsealed since the bearings were lubricated and cooled by the flow of mud therethrough.

Such designs have worked quite well and have dramatically improved the lifetime of motor bearings. In fact, the diamond bearings have worked so well and lasted so long during operation that a problem has arisen with erosion of the support structure at the base of the cylindrical studs. This, of course, is caused by the mud passing around the studs. Because of such erosion, the studs would eventually break away from the bearing assembly even though the diamond surface was barely worn.

Various steps have been taken to alleviate this problem but none of these steps have been totally satisfactory.

One solution to the problem was to provide hardfacing to the support ring. Although improved results were obtained, erosion still occurred.

SUMMARY OF THE INVENTION

The present invention obviates the above-mentioned shortcoming in PCD studded thrust bearings by making the annular support rings out of tungsten carbide.

The thrust bearing assembly in accordance with the present invention comprises a rotatable support ring fixedly attached to the drive shaft of a downhole motor. The support ring includes a plurality of diamond inserts closely spaced around the ring. The assembly further includes a stationary support ring fixedly attached to the housing of the motor. The stationary ring includes a plurality of diamond inserts spaced relativey further apart on the ring to allow cooling fluid to pass therethrough. The stationary ring is made of tungsten carbide.

Although being a more costly material than steel, using tungsten carbide as the base metal for the bearing support rings does not require the use of more cumbersome hardfacing procedures. Moreover, erosion of the part is practically eliminated, and the wear life is greatly extended. As a result, the repair costs on such parts have been reduced by fifty percent.

DESCRIPTION OF THE PREFERRED EMBODIMENTS AND BEST MODE FOR CARRYING OUT THE INVENTION

Figure 1A:
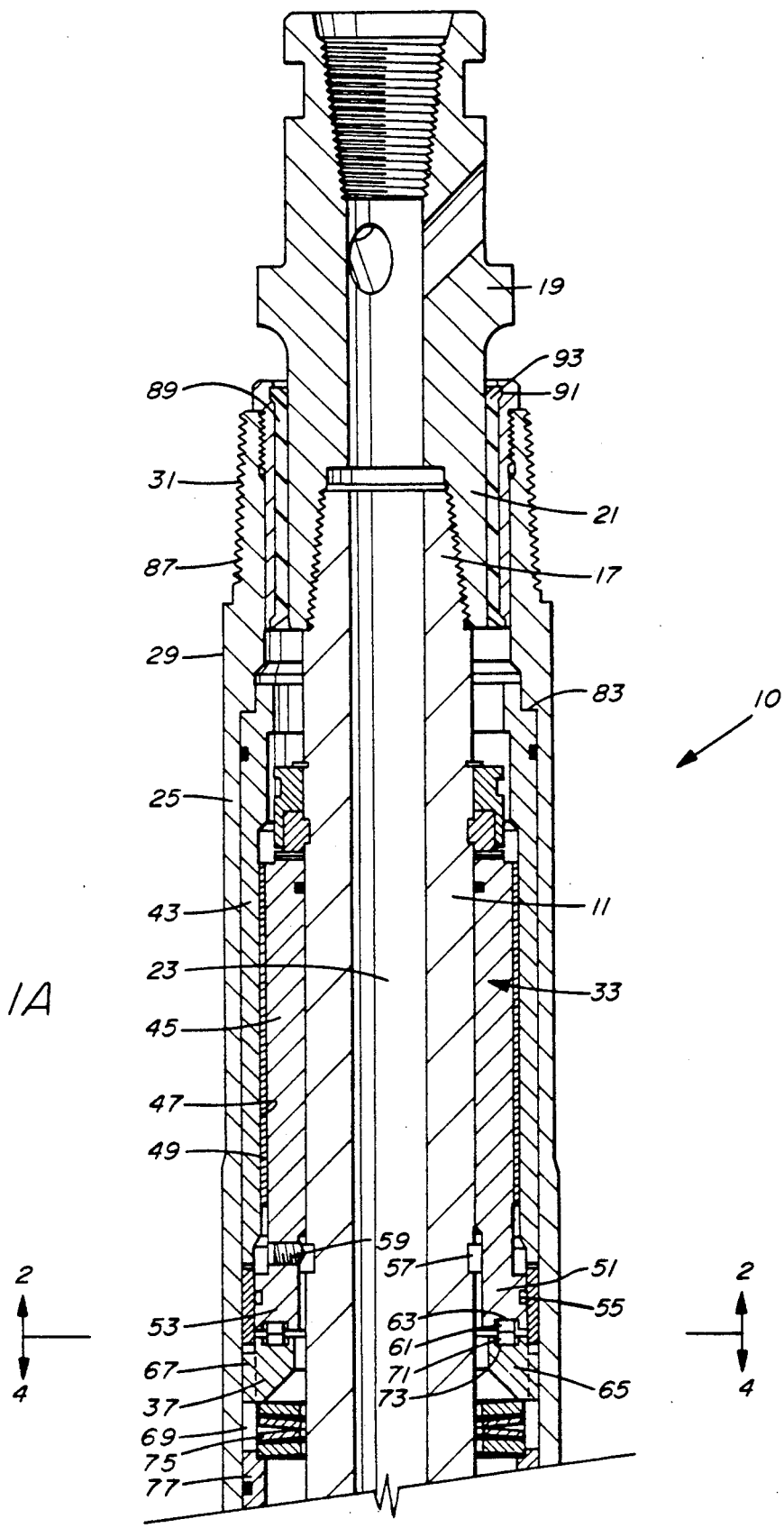
FIGS. 1A and 1B are a sectional view of a downhole motor drive shaft assembly which includes the thrust bearing assemblies in accordance with the present invention.
Figure 1B:
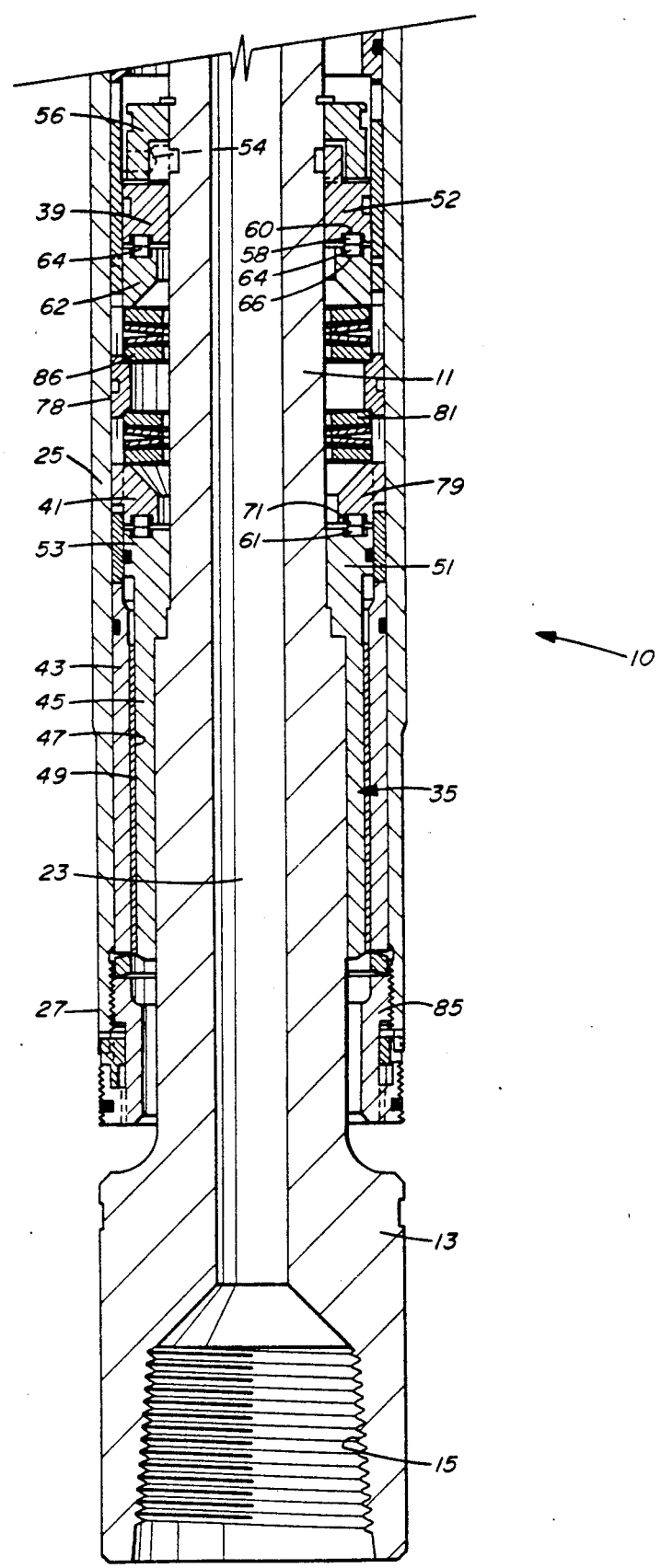

Referring now to the drawings, FIG. 1 shows a drive shaft assembly, generally indicated by arrow 10, comprising an elongated tubular drive shaft 11 having an enlarged end 13 for housing a threaded box connection 15. A conventional drill bit, not shown, is adapted to be connected to the drive shaft 11 via the box connection 15.

The other end of the drive shaft 11 includes a pin connection 17 which is adapted to be threadedly connected to the lower end of a connecting rod assembly 19 via a box connection 21.

The interior of the drive shaft 11 includes a bore 23 which is adapted to provide fluid communication with the drilling fluid passing through the motor to the bit.

An outer housing 25 extends around the drive shaft 11 and extends from one lower end 27 terminating near the enlarged end 13 of the drive shaft 11 to the upper end 29 terminating with a threaded pin section 31. The housing 25 is adapted to be threadedly connected via the pin section 31 to the rest of the motor housing (not shown), which, in turn, is adapted to be threadedly connected to the lower end of the drill string.

The housing 25 functions to rotationally support the drive shaft 11 and also to support the thrust loads passing therethrough. This is accomplished by two sets of radial bearing assemblies 33 and 35 and three sets of thrust bearing assemblies 37, 39 and 41.

The upper and lower radial bearing assemblies 33 and 35 respectively includes an outer sleeve 43 which is fixedly attached to the housing 25 and an inner sleeve 45 which is fixedly attached to the drive shaft 11.

Each sleeve 43 and 45 is typically made of steel having a radial bearing surface 47 and 49 respectively, in a recessed area. The radial bearing surfaces 47 and 49 typically employ tungsten carbide inserts or a tungsten carbide chip matrix affixed to the steel sleeves 43 and 45.

As further illustrated, the steel sleeve 45 includes an extension 51 which has a thrust head 53 at its end. The outer surface of the thrust head 53 includes a recessed annular assembling groove 55 which functions to interact with a pulling tool to remove the bearing sleeve from the drive shaft.

The steel sleeve extension 51 further includes a locking assembly 57 and 59 for locking the steel sleeve 45 to the drive shaft 11.

Figure 2:
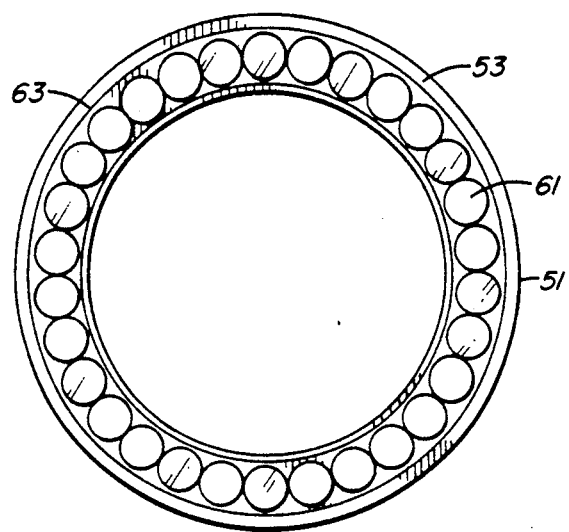
FIG. 2 is an elevational view taken along lines 2—2 of FIG. 1A.

The thrust bearing insert assembly 37 is provided on the lower end of extension 51. The bearing includes a number of bearing inserts 61 bonded into a groove 63 formed in the extension 51. The inserts 61 are preferably tungsten carbide studs having a polycrystalline diamond surface layer. The inserts 61 are very closely spaced next to each other as shown in FIG. 2 to form a nearly continuous bearing surface.

Figure 4:
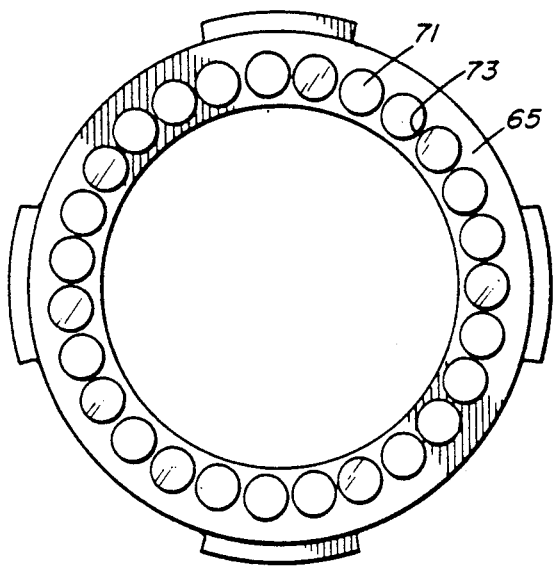
FIG. 4 is an elevational view of the bearing ring taken along lines 4—4 of FIG. 1A.

The bearing assembly 37 also includes a stationary thrust ring 65 having a pair of outwardly extending lugs 67 which is adapted to extend into a pair of slots 69 formed in the housing 25. The thrust ring 65 includes a number of bearing inserts 71 bonded into holes 73 formed in the ring 65. The inserts 71 are of the same construction as inserts 61. The inserts 71 are not as closely spaced as the inserts 61 (see FIG. 4). This is done to allow space for cooling fluid to pass around the inserts 71 to cool the bearing surfaces of both sets of inserts 61 and 71.

A set of belleville spring washers 75 are mounted within the interior of the housing 25 and are adapted to be urged against the ring 65 with the other end of the set of washers 75 abutting against a lower spacer ring 77.

In accordance with the present invention the thrust ring 65 is preferably made of a metal carbide such as tungsten carbide. This is especially advantageous because a large majority of the drilling or cooling fluid flow passes around the inserts 71. The carbide material prevents any erosion at the base of the inserts 71.

It should be noted that, if desired, the extension 51 of the bearing sleeve 45 could also have a tungsten carbide ring mounted on the end thereof for supporting the inserts 61. In such an embodiment the spacing of the inserts 61 could be as great as in the inserts 71 in the ring 65.

Figure 3:
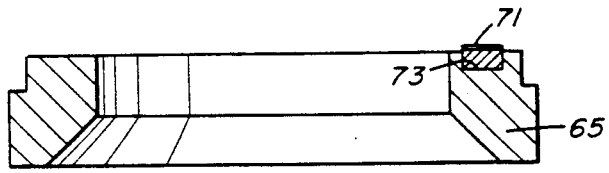
FIG. 3 is a sectional view of the stationary bearing ring used in the drive shaft assembly.

The second thrust bearing 39 comprises a rotatable support ring 52 fixedly attached to the drive shaft 11 by locking pins 54. A backing plate 56 extends around a portion of the support ring 52 to be attached thereto. The support ring 52 also includes a number of diamond bearing inserts 58 bonded into a groove 60 formed in the ring 52. The inserts 58 are very closely spaced next to each other in the same manner as the inserts 61 shown in FIG. 3.

The bearing assembly 39 further includes a stationary ring 62 fixedly attached to the housing 25 and is similar in construction to the thrust ring 65. This includes the fact that the thrust ring 62 is made of tungsten carbide. In a similar fashion, the thrust ring 62 includes a plurality of diamond inserts 64 bonded in holes 66 of the rings 62. The inserts 64 are spaced in a manner similar to the spacing of the inserts 71 shown in FIG. 5, in order to allow cooling fluid to pass around the inserts.

A second stack of belleville washers 66 are mounted within the housing 25 to be urged against the ring 62 with the other end thereof abutting against a spacer ring 78.

The lower radial bearing assembly 35 is similar in construction to the upper bearing assembly 33 with like numbers illustrating the components corresponding thereto.

Similarly the bearing assembly 41 comprises an oppositely facing thrust ring 79, identical to the construction of thrust ring 65, and is provided to have inserts 71 engaging inserts 61 of the bearing sleeve 45. The stationary thrust ring 79 is also preferably made of a metal carbide to prevent erosion around the base of the inserts 71.

Finally a third set of belleville washers 81 are provided to abut at one end to the fixed spacer sleeve 78 and at the other end to the thrust ring 79.

In assembly, the outer sleeves 43, the stationary thrust rings 65, 52 and 79, along with the belleville washers 75, 66 and 81, and the spacer rings 77 and 78, are all stacked within the housing 25 to be fixedly attached thereto. This is accomplished by the upper end of the upper sleeve 43 fitting against a shoulder 83 while the lower end of the lower sleeve 43 bears against a lock ring 85 which is threadedly connected to the housing 25.

The upper end of the housing 25 includes a pin connection 87 for connection to the lower end of the motor connecting rod housing (not shown). The interior of the pin connection 87 houses a marine bearing 89 having a stationary member 91 attached thereto and a rotating member 93 attached to the connecting rod 19.

In operation, drilling fluid passes through the interior of the connecting rod housing with a large majority of the flow passing through ports located in the connecting rod 19. The major flow then passes through the interior of the drive shaft 11 to exit through the other end thereof to pass through the drill bit.

A smaller portion of the drilling fluid flow passes through the marine bearings 89 and then between the bearing sleeves 43 and 45 of bearing assembly 33. The flow then continues across the thrust bearing assemblies 37, 39 and 41 to lubricate and cool the inserts 61, 64 and 71. The flow then continues across the lower radial bearing assembly 35 and exits at the lower end of the housing 25.

As stated previously, the tungsten carbide rings 62, 65 and 79 function to prevent erosion around the inserts 61, 64 and 71.

It will of course be realized that various modifications can be made in the design and operation of the present invention without departing from the spirit hereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A drive shaft and bearing assembly for a downhole motor adapted for connection at one end to the lower end of a drill string and at the other end to a drill bit to be driven thereby, comprising:
   tubular housing means and rotary shaft means supported therein and extending therefrom and adapted to support a drill bit;
   bearing means in said housing means supporting said rotary shaft means;
   lubricating and cooling means for said bearing means;
   said bearing means comprises a radial bearing having one bearing member supported on said housing means and another bearing member supported on and rotatable with said rotary shaft means;
   said bearing means further comprising an annular thrust bearing for vertical or longitudinal thrust loads comprising a first bearing member supported on and rotatable with said rotary shaft means and a second bearing member supported on said housing means;
   a first plurality of insert members closely spaced around said first bearing member, extending longitudinal of said motor and having flat co-planar polycrystalline diamond bearing surfaces extending beyond the surface of said first bearing member;
   said second bearing member comprising an annular support plate;
   a second plurality of insert members equally spaced around said support plate at distances greater than those of said first set of inserts to allow said lubricating means to pass therethrough, extending longitudinally of said motor toward said first bearing member and having flat co-planar polycrystalline diamond bearing surfaces extending beyond the surface of said support plate and engaging said first plurality of inserts along a common plane; and said support plate being made of a metal carbide material to prevent erosion of the material supporting said second plurality of inserts.

2. The invention of claim 1 wherein said support plate is made of tungsten carbide.

3. A drive shaft and bearing assembly for a downhole motor adapted for connection at one end to the lower end of a drill string and at the other end to a drill bit to be driven thereby, comprising:

tubular housing means and rotary shaft means supported therein and extending therefrom and adapted to support a drill bit;

lubricating and cooling means for said bearing means;

said bearing means comprising an annular thrust bearing having one bearing member supported on said housing means and another bearing member supported on and rotatable with said rotary shaft means;

a first plurality of insert members closely spaced around said first bearing member, extending longitudinal of said motor and having flat co-planar polycrystalline diamond bearing surfaces extending beyond the surface of said first bearing member; said second bearing member comprising an annular support plate;

a second plurality of insert members equally spaced around said support plate at distances greater than those of said first set of inserts to allow said lubricating means to pass therethrough, extending longitudinally of said motor toward said first bearing member and having flat co-planar polycrystalline diamond bearing surface extending beyond the surface of said support plate and engaging said first plurality of inserts along a common plane; and said support plate being made of a metal carbide material to prevent erosion of the material supporting said second plurality of inserts.

4. The invention of claim 3 wherein said support plate is made of tungsten carbide.

5. A drive shaft and bearing assembly for a connection at one end to the lower end of a drill string and at the other end to a drill bit to be driven thereby, comprising:

tubular housing means and rotary shaft means supported therein and extending therefrom and adapted to support a drill bit;

bearing means in said housing means supporting said rotary shaft means;

lubricating and cooling means for said bearing means;

said bearing means comprising an annular thrust bearing for vertical or longitudinal thrust loads comprising a first bearing member supported on and rotatable with said rotary shaft means and a second bearing member supported on said housing means;

said first bearing member comprising a first annular support plate;

a first plurality of insert members equally spaced around said first support plate, extending longitudinal of said motor and having flat co-planar polycrystalline diamond bearing surfaces extending beyond the surface of said first support plate;

said second bearing member comprising a second annular support plate;

a second plurality of insert members equally spaced around said second support plate, extending longitudinally of said motor toward said first support plate and having flat co-planar polycrystalline diamond bearing surfaces extending beyond the surface of said second support plate and engaging said first plurality of inserts along a common plate; and one of said first and second support plates being made of a metal carbide material.

6. The invention of claim 5 wherein said metal carbide material is tungsten carbide.

7. The invention of claim 5 wherein said first support plate is made of tungsten carbide.

8. The invention of claim 5 wherein said second support plate is made of tungsten carbide.

* * * * *